Sept. 9, 1969 SHIGEO ONO ET AL 3,465,934
APPARATUS FOR AUTOMATICALLY CRACKING OFF A GLASS SHEET
AND TAKING OFF CRACKED OFF GLASS PLATES
Filed Oct. 16, 1967 2 Sheets-Sheet 1

INVENTORS
SHIGEO ONO, SEIICHI KAYANO,
AND RYOICHI NEGISHI
BY
Stephens, Huettig & O'Connell
ATTORNEYS Sept. 9, 1969    SHIGEO ONO ET AL    3,465,934
APPARATUS FOR AUTOMATICALLY CRACKING OFF A GLASS SHEET
AND TAKING OFF CRACKED OFF GLASS PLATES
Filed Oct. 16, 1967    2 Sheets-Sheet 2

INVENTORS
SHIGEO ONO, SEIICHI KAYANO,
AND RYOICHI NEGISHI
BY
Stephens, Huettig & O'Connell
ATTORNEYS United States Patent Office 3,465,934
Patented Sept. 9, 1969

3,465,934
APPARATUS FOR AUTOMATICALLY CRACKING OFF A GLASS SHEET AND TAKING OFF CRACKED OFF GLASS PLATES
Shigeo Ono, Seiichi Kayano, and Ryoichi Negishi, Yokohama, Japan, assignors to Asahi Glass Co., Ltd., Tokyo, Japan
Filed Oct. 16, 1967, Ser. No. 675,661
Claims priority, application Japan, Oct. 18, 1966, 41/68,078; Nov. 30, 1966, 41/78,044
Int. Cl. B26f 3/00, 3/02; B65h 35/00
U.S. Cl. 225—103                        5 Claims

ABSTRACT OF THE DISCLOSURE

A taking off device provided with chucks capable of adhering to a glass sheet by suction is located by the side of a continuously rising glass ribbon so as to be able to move forwardly and backwardly to said glass ribbon. The vacuum chucks are caused to adhere to the surface of the continuously rising glass ribbon by suction and the glass sheet ribbon can be risen positively by the power of cylinder. An external force is acted on the scored glass sheet in the direction perpendicular to the surface of the glass sheet while the glass sheet being positively raised by the power of cylinder, whereby said glass sheet ribbon is cracked off along scored lines and the cracked off glass plate is broken apart from the said rising glass sheet ribbon.

BACKGROUND OF THE INVENTION

Field of the invention

The present invention relates to an apparatus for automatically cracking off a glass sheet and taking off cracked off glass plates and more particularly, to an apparatus for scoring and cracking off a ribbon-shaped glass sheet which is continuously rising from a drawing up or annealing apparatus, along the scored lines and breaking apart the cracked off glass plate from the ribbon-shaped glass sheet.

Description of the prior art

Conventional known apparatuses for producing the score lines in a predetermined size on a glass sheet ribbon continuously rising from a drawing up or annealing apparatus, in order to obtain a glass plate suitable for the subsequent stage or use, and cracking off the glass ribbon on the scored lines and then breaking apart the thus cracked off glass plate from the glass ribbon in rising were not satisfactory in cracking off the glass sheet ribbon along scored lines accurately and reliably without temporarily stopping or obstructing the rise of glass sheet ribbon and in conveying the cracked off glass plates in the intact state or in change of direction.

BRIEF SUMMARY OF THE INVENTION

The primary object of the present invention is to provide an apparatus for precisely and accurately cracking off a continuously rising glass sheet ribbon along the scored lines produced at predetermined intervals.

Another object of the invention is to provide an automatic cracking off and taking off apparatus for a glass sheet ribbon, which is capable of safely supporting glass plate thus cracked off along scored lines and broken apart from a rising glass sheet ribbon after the cracking off.

A further object of the invention is to provide an automatic cracking off and taking off apparatus for a glass sheet ribbon, which can convey said broken apart or taken off glass plate in the intact state or in change of direction.

The objects of the invention can be attained by an improved apparatus for cracking off a continuous rising ribbon-shaped glass sheet along the scored line and then breaking apart the glass plate cracked off in a predetermined size, wherein a taking off device equipped with vacuum chucks for adhering to the surface of the glass sheet ribbon by suction is located by the side of the glass ribbon so as to be able to move forwardly and backwardly to said glass ribbon, said chucks being movable upwardly together with the glass ribbon in a state adhered thereto by suction and moreover, a drawing up force or a lifting force is imparted to the glass sheet ribbon by the power of cylinder at the time when the glass ribbon is cracked off along the scored line, and thus, the glass ribbon in rising is cracked off by such taking off device along scored line under the action of said drawing up force.

BRIEF DESCRIPTION OF THE DRAWINGS

In order to enable the invention to be more readily understood, reference is now made by way of example to the accompanying drawings which illustrate diagrammatically an embodiment thereof, in which:

FIG. 7 is an enlarged plan view showing an embodiment of a cam guide in case where the direction of the taking off device is changed at an angle of 90°.

DETAILED DESCRIPTION INCLUDING PREFERRED EMBODIMENTS

Figure 1:
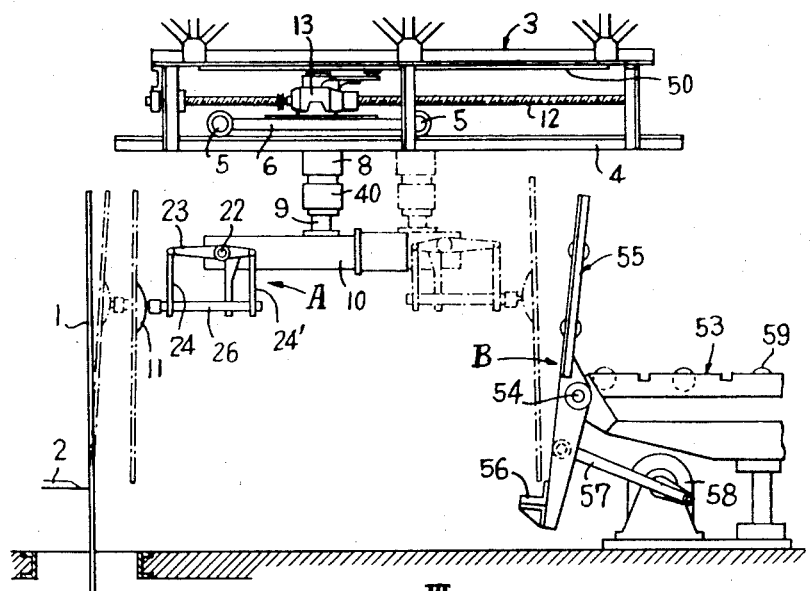
FIG. 1 shows a side view of the whole of an apparatus for automatically cracking off and taking off a glass sheet according to the present invention, in which dot and dash lines show a state at the time when a glass plate firmly held by a taking off device is revolved at 180° in order to transfer said glass plate onto a loading apparatus.

The invention will now be illustrated more fully on preferred embodiments with reference to the accompanying drawings.

As described above, FIG. 1 is a whole view of an automatic cracking off and taking off apparatus for a glass sheet ribbon according to the present invention, wherein a ribbon-shaped glass sheet 1 continuously formed in a constant width from molten glass rises at a speed corresponding to the speed of its formation and when the length from its upper end reaches a sufficient length adaptable for the subsequent stage or use, a cutter 2, which was waiting so far apart from the glass sheet ribbon 1, produces a transverse score line on the surface of glass sheet while it moves from one edge toward the opposite edge of the glass sheet in contact with the glass sheet ribbon.

The main part of the said apparatus comprises a taking off device A provided so as to be able to move forward and backward to the glass sheet ribbon 1, in order to crack off or break off the said glass sheet ribbon along the scored line. The taking off device A comprises a revolving shaft 9 which is fitted revolvably in a sleeve case 8 attached to a table plate 7 (FIG. 6) of stand 6 rested for example, through the intermediary of wheels 5 on a rail 4 supported by a suspending frame 3. At the lower end of the revolving shaft 9 there is provided a power cylinder case 10 for mounting vacuum chucks 11. Thus the taking off device A is movable reciprocally on the rail 4 by means of a motor 13 disposed on the stand 6. 12 is a screw shaft which is provided for reciprocally moving the taking off device A.

Figure 3:
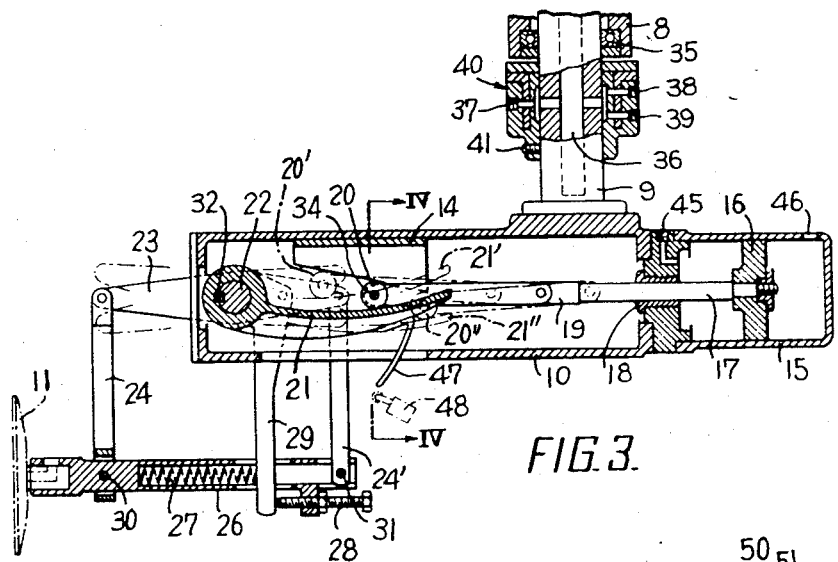
FIG. 3 is an enlarged cross sectional view taken along the line III—III of FIG. 2 and line IIIa–IIIa of FIG. 4, wherein dot and dash lines indicate states at the time when an operating lever, roller and rod have been displaced.
Figure 4:
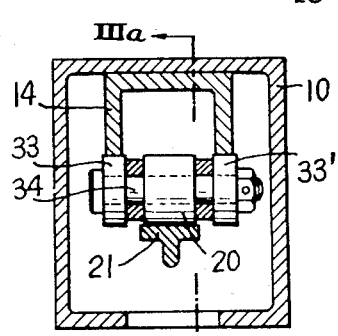
FIG. 4 is an enlarged cross sectional view taken along the line IV—IV of FIG. 3.

FIG. 3 shows a cracking off mechanism provided in a power cylinder case 10 shown in FIG. 1. As shown in the drawing, there are provided a cylinder 15 and a piston 16 at the rear end of a cam 14 fixed on the inner wall of the power cylinder case 10 and having an inclined surface, a piston rod 17 being held by bearing with a bush 18 and extending towards the cam 14. On the foremost end of a rod 19 which is connected to the end of said piston rod 17, there are provided guide rollers 33, 33' and a roller 20 with a pin 34 as shown in FIG. 4, said guide rollers being adapted for rolling in contact with the inclined surface of said cam 14. When by action of the piston rod 17 the guide rollers 33 and 33' are moved on the cam 14, the roller 20 will roll on a slidable linear surface or a curved surface of an operating lever 21 secured to an operating shaft 22 by means of a key 32 so that the operating lever 21 revolves about the operating shaft 22.

A power of cylinder is generated through the intermediary of the reciprocating mechanism of said piston 16 and piston rod 17. A drawing up force or lifting force is imparted to the glass sheet ribbon by the power of cylinder at the time when said glass sheet ribbon is cracked off.

Figure 2:
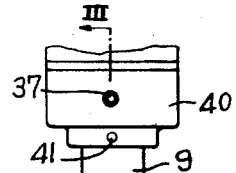
FIG. 2 is an enlarged side view, partly cut away and viewed from the front, of vacuum chuck portions of an apparatus for automatically cracking off and taking off glass sheet shown in FIG. 1.
Figure 2:
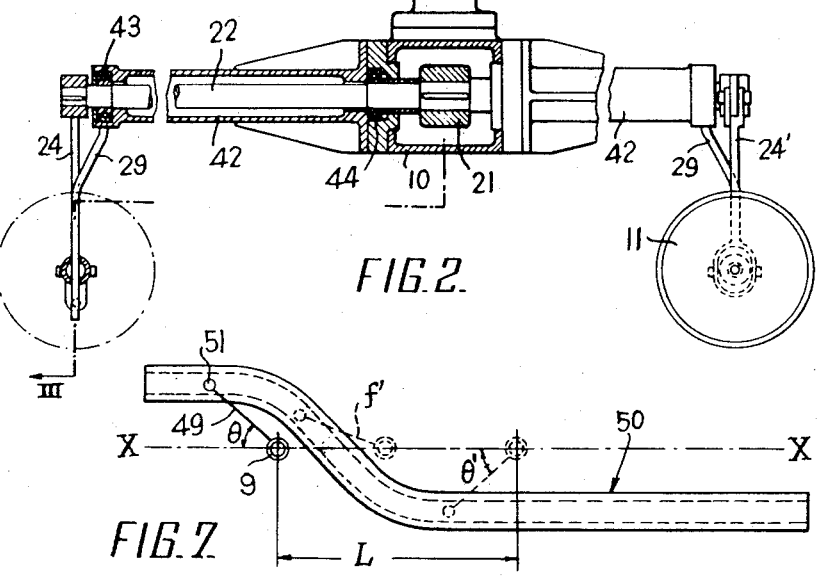

The aforesaid operating shaft 22 is, as shown in FIG. 2, supported firmly with bearings 43 and 44 in an operating shaft case 42 provided on both sides of the power cylinder case 10 and revolves together with the operating lever 21 when it revolves in the above-mentioned way. On both ends of the operating shaft 22 there is rigidly fixed a holder lever 23, and suspending members 24, 24' are jointed respectively on each end of the holder lever 23 in a balance shape. A chuck holder 26 is supported transversely by pins 30 and 31 at the lower end each of said suspending members 24 and 24'. The vacuum chucks 11 for adhering to the rising glass sheet ribbon by suction are thus respectively mounted on the front end of the chuck holder 26 suspended respectively from both ends of the operating shaft 22 and normally projected in the position nearest to the glass sheet ribbon 1 of all the part of the taking off device A.

Since, in this case, the chuck holder 26 is suspended from suspending members 24 and 24', it is particularly unstable in the longitudinal direction. A fixed rod 29 is provided for fixing this chuck holder 26 to the taking off device A, more precisely, to the operating shaft case 42. At least one part of this fixing rod 29 is fixed to the operating shaft case 42 near the said holder lever 23 attached to both ends of the operating shaft 22 so that it cannot move even when the operating shaft 22 revolves. Furthermore, the lower end of the fixing rod 29 is penetrated through a perforation formed in the chuck holder 26, receives a spring 27 accommodated in said chuck holder, and its projected portion through said perforation is supported with a bolt 28 from the opposite side of the spring 27. Thus, the chuck holder 26 is made more stable by the fixing rod 29 in the transverse direction and also it is fixed in the longitudinal direction with the spring 27 and the bolt 28.

Further, in this case, the left and right chuck holders (in FIG. 2) may be connected adequately for stabilizing the construction of the chuck holder 26. This embodiment shows two chucks 11 in symmetrical arrangement on both left and right sides, the number of which may, however, be increased or decreased, as required. Normally, it is preferable to provide two or more chucks at adequate intervals so as to support more safely the glass sheet ribbon.

In FIG. 3, if the operating lever 21 revolves about the operating shaft 22 in the above-described way, for instance, in the clockwise direction with the operation of the cylinder 15, the holder lever 23 revolves in the same direction about the operating shaft 22 so that the suspension member 24 moves upwardly and the suspension rod 24' downwardly respectively, thereby the chuck holder 26 held in suspension by these suspension members gradually inclines to allow the chucks 11 to rise its front end upwardly.

Said cylinder 15 for operating such cracking off mechanism may be operated by vacuum or fluid, such as compressed air. For instance, operation of the cylinder 15 by vacuum will now be described in the following.

Now, a hollow part 36 of the revolving shaft 9 (in FIG. 3) leads to a vacuum pump (not shown). Said hollow part 36 is connected to the said cylinder 15 with connectors, such as tubes which connect holes 38 and 39 provided in a distributor 40 attached to said shaft 9 with a screw 41 to the holes 45 and 46 of said cylinder 15 respectively. The above cylinder 15 is actuated by control of a change-over valve provide din said distributor 40. On the other hand, the chucks 11 are connected to other hole 37 of said distributor.

The taking off device A which was so far waiting by the side of the continuously rising glass sheet ribbon 1 apart therefrom advances forward to the said glass ribbon 1 by the motor 13, when the glass ribbon rises to a length adapted for the subsequent stage and use, and the chucks 11 are caused to adhere to the surface of the rising glass ribbon by suction, in which case the spring 27 in the chuck holder 26 serves as a buffer means when the chucks 11 abut the glass sheet 1.

On the other hand, in conjunction with such action of the taking off device A, scoring means or the cutter 2 produces a transverse score line on the surface of the glass sheet 1 as said scoring means 2 runs for one edge toward the opposite edge of the glass sheet in contact therewith, as hereinbefore described.

When the chucks 11 fully adhere to the glass sheet ribbon 1 by suction, then the cylinder 15 is operated and the piston 16 positioned in front of said cylinder moves rightward in FIG. 3. The guide rollers 33 and 33' move along the inclined surface of the cam 14 as the piston 16 moves in the same direction. At the same time the roller 20 moves in the same direction from the position 20' shown in FIG. 3 by dot and dash lines. In consequence, the operating lever 21 in contact with the roller 20 revolves in the clockwise direction gradually about the operating shaft 22 by means of said roller 20. The lever 21 revolves the holder lever 23 fixed on both ends of said operating shaft 22 in the same direction and inclines the chuck holder 26 in a state where the chucks 11 are caused to adhere to the glass sheet 1 by suction.

FIG. 3 shows guide rollers 33 and 33' being on half way of the cam 14. In this figure, 20' indicates the displaced position of the roller 20 and 20" indicates a position when the piston 16 has moved backwardly. 21' and 21" indicate respectively the state of the operating lever 21, which varies with such movement of the roller 20.

In the present apparatus, the reciprocating movement of the piston 16 can be varied into a revolving movement of the operating shaft 22 through the operating lever 21 and furthermore, the revolving movement of the operating shaft 22 can be varied into the up and down movement of the chucks 11 through the holder lever 23 and the chuck holder 26.

However, movement of the chucks 11 is restricted by the glass sheet ribbon 1 when they firmly adhere to the glass sheet ribbon 1 by suction and cannot move freely even if the cylinder 15 is operated. Accordingly, the chucks 11 adhered to the glass sheet ribbon by suction come to movement together with the glass sheet ribbon at all times. During such time the chucks 11 tend to rise in excess of the rising speed of glass sheet ribbon by the power of the cylinder 15 so that it imparts a lifting force or a drawing up force to the glass sheet ribbon while at the time, receives a corresponding force of resistance from the glass sheet ribbon. These lifting and resistance forces are always in an equilibrium when the chucks 11 are adhering to the glass sheet 1 by suction. The strength of forces in an equilibrium depends on the power of the cylinder 15. For instance, if the cylinder 15 is applied with a great force, the taking off device A will impart a large lifting force to the glass sheet ribbon through the chucks 11. The lifting force of the taking off device A actuates on the glass sheet ribbon as soon as the cylinder 15 actuates after adhesion of the chucks 11 by suction, and it continues until the glass sheet ribbon 1 is cracked off or broken off by a method hereinafter described.

Thus, the chucks 11 adhered to the glass sheet ribbon 1 by suction move upwardly therewith following the glass sheet ribbon 1. When the chucks 11 are moved upwardly. the operating lever 21 attached to the operating shaft 22 revolves gradually about said shaft 22, and when the glass sheet ribbon reaches a predetermined height, a projection 47 provided on said operating lever 21 actuates a limit switch 48 for starting the motor 13 of the taking off device A. With the starter of the motor 13 the taking off device A, which was in rest so far, goes on the rail 4 away from the glass ribbon 1. Further, the cylinder 15 of the taking off device A operates normally as soon as the chucks 11 adhere to the glass sheet ribbon 1 by suction, said cylinder however, is required to operate at latest before the taking off device A starts to move.

The backward movement of this taking off device A applies an external force on the scored glass sheet 1 perpendicular thereto, whereby the glass sheet 1 which has been rising while being positively drawn up by the chucks 11 is cracked off along the previously scored line by this backward movement and glass plate cut or cracked off into predetermined size is broken apart from the glass sheet ribbon 1.

In this way, the glass sheet ribbon 1 can be cracked off precisely and accurately along the scored lines by the taking off device A without its rising movement being stopped or obstructed. This glass plate cracked off and broken apart from the glass sheet ribbon 1 is simultaneously held in suspension by the chucks 11.

In this taking off mechanism, said lifting force or drawing up force is quite important for cracking off the continuously rising glass sheet ribbon 1 precisely and accurately along the scored lines without obstructing the rise of glass sheet. If ever the taking off device A cracks off the glass sheet ribbon 1 by acting only a force perpendicular to the surface of the glass sheet without substantially imparting the said lifting force to the glass ribbon, the taking off device A will act on the glass sheet ribbon 1 in rising at a constant speed so as to obstruct its rise. When the glass sheet ribbon 1 is affected by such braking action from the taking off device A, the glass sheet ribbon 1 will change its rising speed, which will result in variation of the thickness of glass sheet or excessive load on a formation device. Further, in case said lifting force is not substantially existing or is too small at the time when the glass sheet ribbon 1 is cracked off or immediately thereafter, the glass plate suspended by the taking off device will stop rising or drop down as soon as they are broken apart from the glass sheet ribbon, and the upper end of the rising glass sheet ribbon 1 will impinge against or contact with the lower bottom end of the glass plate, and thereby results in damages to the glass sheet. Such a phenomenon is particularly noticeable when glass plate drops down by its own weight as soon as cracked off. Accordingly, the said lifting force of the taking off device A should be adjusted larger than the weight of said glass plate so as to enable the cracked off glass plate to draw up at the same speed or higher speed than the rising speed of the glass sheet ribbon at the same time as the breaking apart of the cracked off glass plate from the glass sheet ribbon 1.

Furthermore, cracking off of the glass sheet ribbon 1 may be carried out as well by providing a fluid reciprocating mechanism on the chuck holder 26 of the taking off device A, on a piston rod of which mechanism the chucks 11 are mounted by operating the fluid reciprocating mechanism, with the taking off device A being stopped to move the chucks 11 backwardly in place of moving the taking off device A backwardly.

The glass plate held in suspension by the taking off device A in the above described method is conveyed by movement of the taking off device A and transferred onto a glass-loading apparatus B (shown in FIG. 1). The most simple method is that the taking off device A is moved backward in the intact state and the cracked glass plate is transferred onto the glass plate-loading apparatus B. However, it often occurs that generally, in this method the glass plate-loading apparatus B obstructs the movement of the taking off device A when transferring the glass plates onto the glass plate-loading apparatus B, and there is also a case where it is not possible to transfer the glass plate in the intact state onto the glass plate-loading apparatus B due to relationship of the direction of the cracked off glass plates and that the glass plate-loading apparatus B. As a consequence, it is required usually to change the direction of the taken off glass plates and then transfer them onto the glass plate-loading apparatus B. The angle for the change of direction is generally 90° or 180°.

In case such a change of direction is required, according to the present invention the taken off glass plates may be turned at any desired angles by utilizing the movement of the taking off device A when they are conveyed or transferred by the taking off device. This change of direction is carried out by a cam guide provided along the moving pathway of the taking off device A.

FIG. 1 shows a case where the taken off glass plate is turned round by 180°, namely reversed by use of a cam guide 50 which is provided along the pathway of the taking off device A and is arranged so as to revolve the revolving shaft 9 rightly by 180° while the taking off device A runs on the rail 4. That is to say, the cam guide 50 has for convenience a groove 52 in a cross-section (shown in FIGS. 5 and 6) and, as shown in FIG. 2, comprises a linear part and a curved part. In the present device, there is provided a cam roller 51 on the arm 49 attached to the end of the revolving shaft 9 of the taking off device A. The cam roller 51 is held in a groove 52 of the above-mentioned cam guide 50 and when the taking off device A runs on the rail 4, said cam roller 51 moves following the cam guide 50, while the revolving shaft 9 is revolved through the arm 49.

The chucks 11 of the taking off device A revolve in company with the power cylinder case 10 mounted on the bottom end of said shaft 9 when this shaft 9 revolves.

Figure 6:
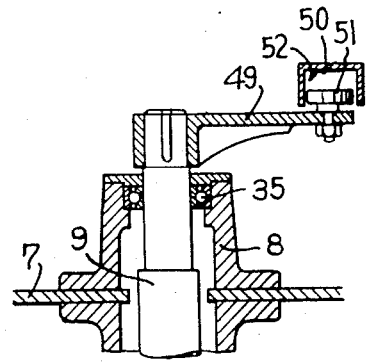
FIG. 6 is an enlarged partial sectional view of a coupling portion of a cam guide for changing the direction of the taking off device, and a revolving shaft of a taking off device.

Furthermore, the arm 49 attached to the top end of the revolving shaft 9 is restricted in its movement or operation by the cam guide 50, because the cam roller 51 at the end of said arm 49 is engages with the groove 52 of the cam guide 50 (as shown in FIG. 6). The movement of said arm 49 is the revolution about the revolving shaft 9 as a fulcrum. The states of the arm 49 being changed by said revolution are respectively indicated in FIG. 5 by the reference characters (a), (b), (c) and (d).

Thus, the state (a) shows that the direction of arm 49 coincides with a track or locus of movement of the linear part of the cam guide 50, namely of the extreme end of said revolving shaft 9. This is because the linear part of the cam guide 50 is provided so as to fully coincide with the upper and lower sides relative to the locus of movement of the revolving shaft 9, and the arm 49 does not revolve about the said shaft 9 while the roll 51 is sliding on the linear part of the cam guide 50. (b), (c) and (d)

indicate respectively the state at the time when the arm 49 has been revolved.

Figure 5:
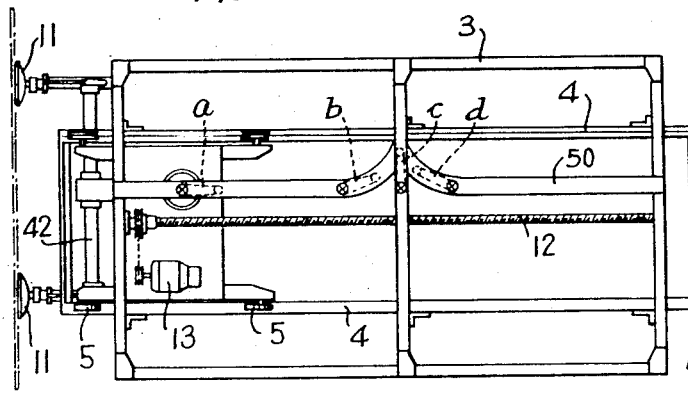
FIG. 5 is an enlarged plan view of a taking off device at the time when it has advanced forward in the automatic crack off and taking off apparatus of FIG. 1.

In this case, said revolving shaft 9 is engaged with the cam guide 50 through the arm 49, and therefore it does not revolve freely when the taking off device A is at rest and even in case of movement, should the distance of the revolving shaft 9 and the cam guide 50 not be changed, so that the chucks 11 will also maintain a fixed position. For instance, the arm 49 at the initial position will engage the linear part of the cam guide 50 in the state of (a) as shown in FIG. 5. The chucks 11 of the taking off device A will, when the arm 49 would remain in this state, be parallel to the surface of the glass sheet ribbon 1. As the arm 49 will maintain the state of (a) when the cam roller 51 is in engagement with the linear part of the cam guide 50 even if the taking off device A moves backward, the glass plates held in suspension by the taking off device A will move toward said glass plate-loading apparatus B without changing its direction. When, by further movement of the taking off device A, the cam roller 51 reaches the curved part of the cam guide 50, the said arm 49 will revolve gradually about the revolving shaft 9 and assume a state of (b) (shown in FIG. 5). When the cam roller 51 reaches the top of the curved part of the cam guide 50 by the advance of the taking off device A, the arm 49 will assume the state of (c), thereby revolving the glass plate rightly by 90° from the initial state (a).

Thus, said taking off device A runs further on the rail 4 and the revolving shaft 9 revolves by 180° from the initial state (a). As a result of the above, the glass plate held in suspension by chucks 11 is turned by 180° also, as shown by dot and dash lines in FIG. 1. Thereafter, the taking off device A releases the vacuous condition of the chucks 11 and transfers the glass plate onto the glass plate-loading apparatus B.

The glass plate-loading apparatus B is located near the end of the moving pathway of the taking off device A and comprises a tilting frame 55 provided relvolvably about a pin shaft 54 on the end of a conveyor 51. At the bottom of the tilting frame 55 there is a receiving plate 56 for placing the glass plate thereon. By turning the tilting frame 55 about 90° by means of a motor 58 through a crank 57 it is possible to load the glass plate placed on the receiving plate 56 onto the conveyor roller 59 of the conveyor 53.

As the revolving shaft 9 is revolved by means of the arm 49 and the cam guide 50 while the taking off device A runs on the rail 4, the angle of its revolution is determined by the shape of the cam guide 50 and by a combination of the revolving shaft 9 of the taking off device A and the cam guide 50. Accordingly, this angle of revolution may be changed freely by suitably selecting them according to working condition. Further, in this case, it is desirable to form the shape of the cam guide 50 so as to smoothly revolve the revolving shaft 9 while the taking off device A moves at a constant speed on the rail 4. Particularly, the shape of the curved part of the cam guide 50 is important because it suddenly changes the moving direction of cam roller 51.

FIG. 7 shows an embodiment of a cam guide 50 suitable for revolving the glass plate taken off by the taking off device by the angle of 90°. In the figure, the line X—X shows a track of the revolving shaft 9 at the time when the taking off device A moves. The revolving shaft 9 of the taking off device A and the cam guide 50 are engaged by the cam roller 51 so that the arm 49 may make an angle of $\theta$ with the line X—X at the initial position and the arm 49 revolves gradually in the anticlockwise direction so as to turn the revolving shaft 9, as the taking off device moves backward. $f'$ shows a mode in the way of this movement. The arm 49 further revolves with the movement of the revolving shaft 9 and when the cam roller 51 reaches the linear part of the cam guide 50, it will make an angle of $\theta'$ in the reverse direction of the line X—X. Accordingly, in this case, let it be assumed that $\theta+\theta'=90°$ ($\theta=45°$, $\theta'=45°$), the revolving shaft 9 would revolve rightly by 90° while it moves by distance L.

Furthermore, in FIG. 7, $\theta$ and $\theta'$ may vary with the change in length of the arm 49 whereby the revolving angle of the revolving shaft 9 may desirably be changed in any angle other than 90°.

With such construction as described above, the present apparatus makes it possible to vary the direction of the glass plate taken off by the taking off device A desirably by revolving the revolving shaft 9 of said taking off device A by use of the cam guide 50 while the glass plate is conveyed in suspension by the taking off device A.

It is apparent that the shape of the cam guide and its cross-section, or other parts of the taking off device may desirably be modified within the scope of the present invention.

What we claim is:

1. An apparatus for cracking off a continuously rising ribbon-shaped glass sheet along scored lines and breaking apart the glass plate cracked off in predetermined size, which comprises a taking off device located by the side of the glass sheet ribbon so as to be able to move forwardly and backwardly to the surface of said glass sheet ribbon; chucks capable of adhering to the surface of said glass sheet by suction; and a power cylinder case for mounting the chucks on the taking off device, which is disposed horizontally at the bottom end of a revolving shaft fitted in a sleeve guide secured to a table plate of a stand capable of moving on a rail and is provided at its inner rear end with a cylinder accommodating a piston and piston rod, said chucks being movable upwardly with the glass sheet ribbon in a state of being adhered thereto by suction and a drawing up force being imparted to the glass sheet ribbon by a power of cylinder, at the time when said glass sheet ribbon is cracked off, and the power of cylinder being generated through the intermediary of the reciprocating mechanism of said piston and piston rod, whereby the glass sheet ribbon in rising is cracked off along scored lines by said taking off device under action of said drawing up force and the cracked of glass plate is broken apart from said glass sheet in rising.

2. An apparatus as claimed in claim 1, wherein the taking off device comprises a stand provided so as to be able to move on a rail forwardly and backwardly, a power cylinder case disposed at the bottom end of a revolving shaft attached to said stand and having a cylinder at its inner rear part, a chuck holder held in suspension by suspending members from both ends of a holder lever revolvable about an operating shaft, and chucks attached to said chuck holder so as to be able to move upwardly with being adhered to a rising glass sheet ribbon by suction, wherein the glass sheet ribbon is cracked off under drawing up force imparted by the power of said cylinder through the chucks and the cracked off glass plate is maintained by said chucks so as not to obstruct the rise of the glass sheet ribbon.

3. An apparatus as claimed in claim 1, wherein a revolving shaft of the taking off device is revolvably attached to a stand which is provided so as to be able to move on a rail.

4. An apparatus as claimed in claim 1, wherein a revolving shaft of the taking off deivce is revolvable, and said taking off device moves along the rail, and by revolving said shaft through the intermediary of a cam guide provided along the advancing pathway of said taking off device, said glass plate held in suspension by chucks is conveyed or moved.

5. An apparatus as claimed in claim 4 which comprises a revolving shaft of the taking off device revolvably mounted on a stand provided so as to be able to move forwardly and backwardly on a rail, a cam guide provided along the advancing pathway of the taking off device and above said shaft, and an arm rigidly fixed on the shaft of the taking off device with the end of the arm being in engagement with said cam guide, wherein said shaft is revolved through the arm by the cam guide when the taking off device moves, whereby the glass plate held in suspension by the chucks of the taking off device is changed in the direction by 90° or 180°.

References Cited

UNITED STATES PATENTS 2,628,453  2/1953  Pye et al. _____ 225—103
2,878,622  3/1959  Insolio _____ 225—103

JAMES M. MEISTER, Primary Examiner

U.S. Cl. X.R.

225—96.5